Patented June 21, 1949

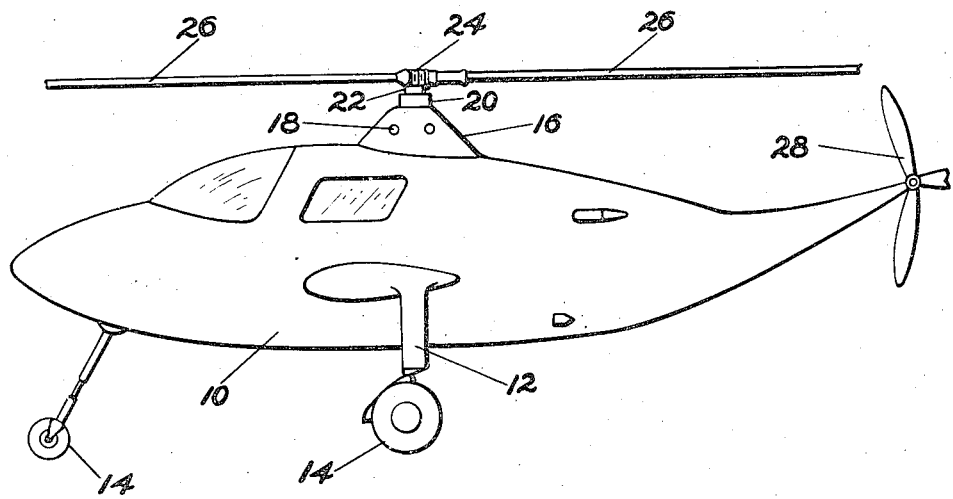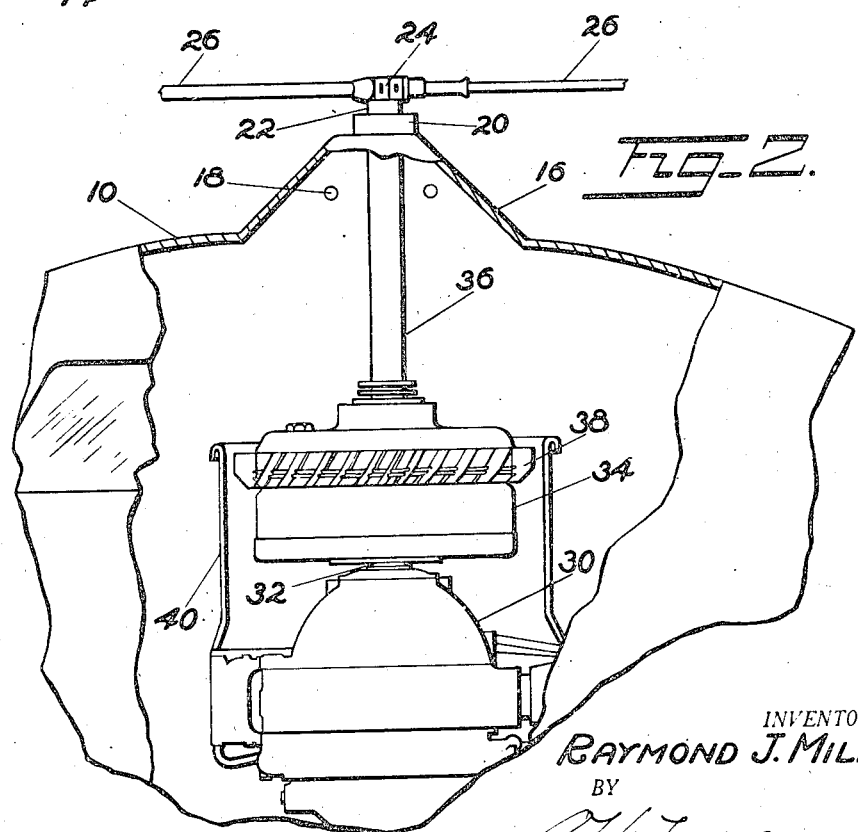

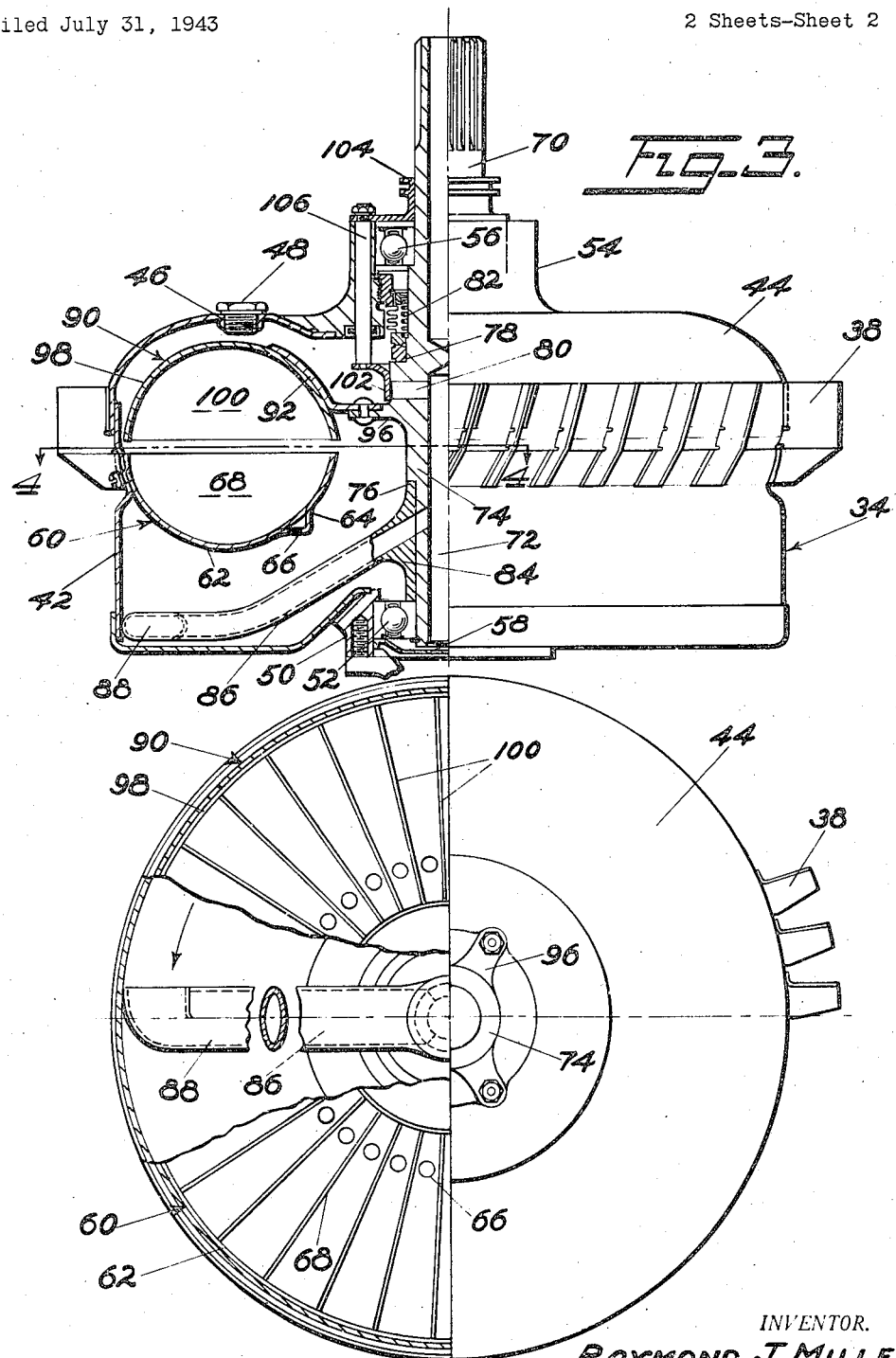

2,473,809

UNITED STATES PATENT OFFICE 2,473,809

FLUID COUPLING

Raymond J. Miller, Detroit, Mich., assignor to Bendix Aviation Corporation, Detroit, Mich., a corporation of Delaware Application July 31, 1943, Serial No. 496,934

5 Claims. (Cl. 60—54)

This invention relates to helicopters, and more particularly to a fluid drive for the main rotor thereof.

Broadly the invention comprehends a fluid coupling connected between the power plant and the main rotor of a helicopter, the coupling being of such structure as to provide for overrunning conditions of the rotor and also for complete disengagement of the power plant from the rotor.

An object of the invention is to provide a fluid coupling wherein the fluid employed for the transmission of power from the driving element to the driven element of the coupling may be manually controlled.

Another object of the invention is to provide a fluid coupling for an engine and a rotor characterized in that the rotor may overrun the engine and further characterized in that the engine may be disengaged from the rotor at the will of the operator.

Other objects and advantages of the invention will appear from the following description taken in connection with the drawings forming a part of this specification, and in which—

Fig. 1 is a side elevation of a helicopter illustrating a practical application of the invention;

Fig. 2 is an enlarged fragmentary view;

Fig. 3 is a vertical sectional view of the fluid coupling; and

Fig. 4 is a sectional view substantially on the line 4—4 of Fig. 3.

Referring to the drawings for more specific details of the invention, 10 represents the fuselage of a helicopter supported on a conventional undercarriage 12 preferably of the tricycle type equipped with the usual ground engaging wheels 14. The fuselage has a superimposed pylon or truncated structure 16 opening into the fuselage, and the pylon has openings 18 for venting the fuselage to the atmosphere.

A gear reduction box 20, suitably mounted on the pylon, has therein a conventional gear reduction system, not shown; and suitable controls, also not shown, may be provided for the gearing system. A driven shaft 22 is connected to the gear system, and a rotor 24 secured to the shaft has variable pitch blades 26 and suitable controls therefor, not shown, and suitably mounted on the tail of the fuselage is a small rotor 28 to counteract the torque caused by the large rotor.

A power plant or an internal combustion engine 30 is suitably mounted in the fuselage. The crankshaft 32 of the engine is connected directly to the driving element of a fluid coupling indicated generally at 34, and the driven element of the coupling is connected by a shaft 36 and the gear reduction system in the gear box 20 and shaft 22 to the rotor 24.

The driving element of the fluid coupling has arranged thereon fan blades 38, and a cowl 40 surrounding the coupling and the engine is open to the atmosphere just above the fan blades. When the engine is in operation, air is drawn by the fan into the cowl and directed thereby against the engine to effectively cool the engine.

The fluid coupling 34 includes a housing, preferably made of two or more stampings, suitably secured together to provide a deep chamber or a reservoir 42, and a cover 44 having a filling opening 46 normally closed by a plug 48. The chamber or reservoir 42 has a concentrically disposed hub 50 having therein a bearing 52, and, correspondingly, the cover 44 has a concentrically disposed hub 54 having therein a bearing 56, and the hub 50 is closed as by a plate 58 held against displacement by the flange of the crankshaft 32, bolted or otherwise secured to the hub.

An impeller, indicated generally at 60, includes a shroud 62 riveted or otherwise secured to the wall of the reservoir in spaced relation to the bottom thereof. The shroud is preferably an annular stamping semi-circular in cross-section with equi-spaced exterior bosses 64 apertured to provide ports 66, and equi-spaced blades 68 are fixedly secured to the shroud between the apertures.

A shaft 70 supported for rotation on the bearings 52 and 56 extends beyond the hub 54 and is splined as shown for connection to the driving shaft 36. The shaft 70 has an axial bore 72 and an enlarged portion 74 providing oppositely disposed shoulders 76 and 78, the purpose of which will hereinafter appear. The enlarged portion has radial passages 80 therethrough providing communication between the axial bore 72 and the interior of the housing, and a fluid seal 82 is interposed between the bearing 56 and the shoulder 78 for inhibiting seepage of fluid from the housing.

A collar 84 fitted tightly on the shaft 70 between the bearing 52 and the shoulder 76 supports a plurality of hollow arms 86 communicating with the axial bore 72 in the shaft 70, and the arms terminate in scoops 88, preferably adjacent the bottom of the reservoir.

A runner indicated generally at 90 is supported in oppositely disposed relation to the impeller 60 on a ring 92 secured to arms 96 extended radially from the shaft 70. The runner includes an outer annular shroud 98 substantially semicircular in cross-section, and vanes 100 are fixedly secured to the shroud in spaced relation to one another.

A sleeve constituting a slide valve 102 on the enlarged portion 74 of the shaft 70 controls the passages 80, and the valve is adapted to be manually actuated by means of a collar 104 shiftably mounted on the shaft 70 and connected to the valve by rods 106.

In operation, assuming that the reservoir 42 is filled with suitable fluid, that the engine is operating at idling speed and that the passages 80 are closed by the manually controlled valve 102, under this condition the working fluid is in the bottom of the reservoir 42 and therefore no power is transmitted from the driving element 60 to the driven element 90 of the coupling, and, accordingly, the power plant or engine 30 and the rotor 24 are completely disengaged.

When the power plant or engine is speeded up, the fluid in the reservoir 42 rotates with the impeller 60 at engine-driven shaft speed. The scoops 88 carried by the shaft 70 face into the path of rotation of the fluid, and as the fluid enters the scoops it flows up through the arms 86 of the scoops into the axial bore 72 of the shaft 70, thence through the passages 80 to the manually operative valve 102.

When operating under this condition, upon opening the valve 102, fluid flows over the back of the runner 90 and enters the circuit by way of the clearance between the impeller 60 and the runner 90. The fluid is now energized by the impeller, and the energy of the fluid is absorbed by the runner, resulting in rotation of the runner and the transmission of power through the shafts 70 and 36 to the rotor 24, resulting in ascent of the helicopter, and upon ascending to the desired altitude, the rotors 24 and 28 may be controlled to effect any desired maneuver.

It is to be understood that the speed differential between the impeller and the runner is inversely proportional to the quantity of fluid supplied to the circuit between the impeller and the runner. The speed of rotation of the runner is somewhat less than that of the impeller, and, accordingly, a speed differential exists between the rotating mass of fluid in the reservoir 42 and the scoops 88. When the valve 102 is fully open, the fluid circuit is operating at its maximum volume, and any excess fluid is returned to the reservoir by way of the ports 66, and under this condition the maximum torque is transmitted with a minimum of slip.

Should the engine be throttled to low or idling speed when the helicopter is in the air, the speed of rotation of the runner will be in excess of that of the impeller. Under this condition, the speed of rotation of the scoops 88 driven by the runner is greater than that of the fluid in the reservoir carried by the impeller, hence the fluid in the reservoir impinges on the backs of the scoops, and, accordingly, no fluid is delivered into the circuit.

At this period of operation, the fluid then in the circuit will drain out through the ports 66 into the reservoir. Under this condition, the slip will be at its maximum, and, accordingly, the rotor may revolve freely with little if any drag on the engine.

When the valve 102 is closed, the scoops 88 do not deliver fluid to the circuit, and the fluid in the circuit drains out through the ports 66 into the reservoir 42, and when the circuit is drained, the rotor is disengaged from the engine. Accordingly, the engine may be started and raced without transmission of power to the rotor, for fluid friction and the action of the fluid on the scoops are not of sufficient value to drive the rotor.

When the engine is in operation, the impeller and its housing rotate at engine drive shaft speed. Under this condition the fan blades on the housing draw air into the cowl, where it is directed against the engine so as to effectively cool the same.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid coupling comprising a rotatable housing having a fluid reservoir therein, a shaft rotatable in the housing having a passage therethrough, scoops in the reservoir carried by the shaft and in communication with the passage, an impeller carried by the housing, a runner carried by the shaft for cooperation with the impeller and providing in conjunction therewith a fluid working circuit and valve means on the shaft for control of communication between the passage and the working circuit.

2. A fluid coupling comprising a rotatable housing having therein a fluid reservoir, a shaft rotatable in the housing having a passage therethrough, scoops in the reservoir carried by the shaft and in communication with the passage, a driving element carried by the housing, a driven element on the shaft for cooperation with the driving element and providing in conjunction with one another a fluid working circuit and a slide valve on the shaft for control of communication between the passage and the working circuit.

3. A fluid power transmitting device comprising a rotatable housing having therein a fluid chamber, a shaft rotatable in the housing having a passage therethrough, scoops in the chamber carried by the rotatable shaft and in communication with the passage, a fluid coupling in the housing including cooperative driving and driven elements, one on the housing and the other on the shaft and a slide valve on the shaft for control of communication between the passage and the fluid coupling.

4. A fluid power transmitting device comprising a rotatable housing having therein a fluid reservoir, a shaft journaled for rotation in the housing having a passage therethrough, scoops carried by the shaft in communication with the passage, a fluid coupling in the housing including a driving element carried by the housing and a cooperative driven element on the shaft and a slide valve on the shaft for control of fluid flow through the passage.

5. In a hydraulic coupling, a rotatable housing providing therein a fluid reservoir, a driven shaft journaled within the housing and having a passage therethrough, an impeller mounted coaxial with the shaft on the inner surface of the housing, a runner on the shaft for cooperation with the impeller and providing a hydraulic working circuit in conjunction therewith, scoops carried by the shaft adapted to provide communication between the reservoir and the passage, and a slide valve on the shaft for controlling communication between the axial passage and the hydraulic working circuit.

RAYMOND J. MILLER.

REFERENCES CITED

The following references are of record in the file of this patent:

UNITED STATES PATENTS

| Number | Name | Date |
|---|---|---|
| 1,817,650 | Ryder | Aug. 4, 1931 |
| 1,859,607 | Sinclair | May 24, 1932 |
| 1,866,424 | Schmieske | July 5, 1932 |
| 1,938,357 | Sinclair | Dec. 5, 1933 |
| 1,963,720 | Sinclair | June 19, 1934 |
| 1,972,175 | Vessey | Sept. 4, 1934 |
| 2,127,738 | Kugel | Aug. 23, 1938 |
| 2,187,667 | Sinclair et al. | Jan. 16, 1940 |
| 2,284,362 | Birmann | May 26, 1942 |
| 2,289,440 | Kugel | July 14, 1942 |